(12) United States Patent
Fukasawa

(10) Patent No.: US 7,831,985 B2
(45) Date of Patent: Nov. 9, 2010

(54) DISK CLAMP MECHANISM AND DISK DEVICE

(75) Inventor: Akihiro Fukasawa, Kyoto (JP)

(73) Assignee: Mitsubishi Electric Corporation, Tokyo (JP)

(*) Notice: Subject to any disclaimer, the term of this patent is extended or adjusted under 35 U.S.C. 154(b) by 707 days.

(21) Appl. No.: 11/794,318

(22) PCT Filed: Nov. 14, 2005

(86) PCT No.: PCT/JP2005/020789
§ 371 (c)(1),
(2), (4) Date: Jun. 27, 2007

(87) PCT Pub. No.: WO2006/129387
PCT Pub. Date: Dec. 7, 2006

(65) Prior Publication Data
US 2008/0098413 A1    Apr. 24, 2008

(30) Foreign Application Priority Data
Jun. 1, 2005   (JP) .............................. 2005-161663

(51) Int. Cl.
*G11B 17/0281* (2006.01)
(52) U.S. Cl. .................................. 720/706
(58) Field of Classification Search ........... 720/604, 720/605, 619, 703, 706, 713; 360/99.05
See application file for complete search history.

(56) References Cited

U.S. PATENT DOCUMENTS

| | | | |
|---|---|---|---|
| 5,926,452 A * | 7/1999 | Park | 720/706 |
| 5,970,044 A | 10/1999 | Kambayashi et al. | |
| 6,754,903 B2 * | 6/2004 | Kato | 720/713 |
| 7,555,762 B2 * | 6/2009 | Hasegawa et al. | 720/712 |
| 2002/0150027 A1 | 10/2002 | Kato | |
| 2006/0174255 A1 * | 8/2006 | Chuo | 720/706 |

FOREIGN PATENT DOCUMENTS

| | | |
|---|---|---|
| JP | 2-11546 U | 1/1990 |
| JP | 4-111266 A | 4/1992 |
| JP | 2680727 B2 | 8/1997 |
| JP | 10-188420 A | 7/1998 |
| JP | 2002-352495 A | 12/2002 |
| JP | 2003-123353 A | 4/2003 |

* cited by examiner

*Primary Examiner*—Angel A. Castro
(74) *Attorney, Agent, or Firm*—Birch, Stewart, Kolasch & Birch, LLP

(57) ABSTRACT

A disk clamp mechanism includes a disk clamper (13), a main chassis (11), a disk clamper pushing member (14) and a resilient member (15). The disk clamper (13) has a contact surface (13a) contacting a disk, and a convex portion (13b) on a side opposite to the contact surface (13a). The main chassis (11) includes a frame body (11a) and a disk clamper holding member (11b) for holding the disk clamper (13). The disk clamper pushing member (14) has a pushing surface (14d) that pushes the convex portion (13b) of the disk clamper (13) toward the disk, and first and second end portions (14a, 14b) provided on both sides of the pushing surface (14d). The first end portion (14a) is swingably supported by the main chassis (11). The resilient member (15) urges the second end portion (14b) of the disk clamper pushing member (14) in the direction in which the pushing surface (14d) pushes the disk.

8 Claims, 9 Drawing Sheets

DISK CLAMP MECHANISM AND DISK DEVICE

TECHNICAL FIELD

The present invention relates to disk clamp mechanisms for holding a disk as an information recording medium such as a compact disk (CD) and a digital versatile disk (DVD), and also relates to disk devices using the disk clamp mechanisms.

BACKGROUND ART

A disk device such as a DVD player is configured to perform recording and reproducing of an information signal while rotating a disk as an information recording medium using a turntable. A clamp mechanism is used to clamp the disk onto the turntable to hold the disk. There is known a disk clamp mechanism (of a first type) configured to push the disk clamper to the turntable side using a resilient force by a plate (see, for example, Patent Document No. 1). There is known another disk clamp mechanism (of a second type) configured to attract the disk clamper to the turntable using a magnet or a magnetic material (see, for example, Patent Document No. 2).

Patent Document No. 1: Japanese Patent Publication No. 2680727 (Page 3, FIG. 2).

Patent Document No. 2: Japanese Laid-Open Patent Publication, No. 2003-123353 (Pages 3-4, FIG. 2).

In the disk clamp mechanism of the first type, movable base on which the turntable is mounted is swingably (movably in the vertical direction) provided on a main chassis. The disk clamper is held by a disk clamper holding member formed of a metal plate having a thickness of 1 mm, and is pushed to the turntable side by the plate spring provided on an upper surface a surface opposite to the turntable) of the disk clamper holding member. When the turntable is moved upward by the swinging of the movable base, the disk clamper is pushed to the turntable side by means of a compression force from the plate spring, so that the disk is clamped between the disk clamper and the turntable.

In the disk clamp mechanism of the second type, the magnet is fixed to the turntable instead of the plate spring. The magnet magnetically attracts the turntable, so that the disk is clamped between the disk clamper and the turntable. Further, the main chassis and the disk clamper holding member are integrally formed of resin.

In either of the disk clamp mechanisms of the first and second types, the force for clamping the disk is approximately 2N (newton) in general.

DISCLOSURE OF THE INVENTION

Problems to be Solved by the Invention

However, the plate metal used as the disk clamper holding member in the disk clamp mechanism of the first type is an expensive material. Further, the magnet or the like used in the disk clamp mechanism of the second type is also an expensive material. Therefore, in terms of the reduction of the manufacturing cost, it is demanded to develop the disk clamp mechanism that does not use such expensive materials.

In this case, it is conceivable to use the plate spring for forcing the disk clamper, and to integrally form the disk clamper holding member and the main chassis using resin. However, with such a configuration, the urging force of the plate spring is applied to a portion for mounting the plate spring of the disk clamper holding member as a reactive force. Therefore, in the case where the disk device is under high temperature environment, there is a possibility that the disk clamper holding member may curve in the direction away from the turntable due to creep deformation. In this case, the distance between the plate spring and the turntable may increase.

When the distance between the plate spring and the turntable increases, the compressing amount of the plate spring decreases during the recording or reproducing, and therefore the urging force with which the disk clamper clamps the disk onto the turntable becomes insufficient. As a result, there arises a problem that a slip between the turntable and the disk may occur to cause trouble in the recording or reproducing function, or to cause the disk to be dropped out of the turntable.

The present invention is intended to solve the above problems, and an object of the present invention is to prevent the creep deformation of the disk clamper holding member to thereby ensure the clamping of the disk onto the turntable.

Means of Solving the Problems

A disk clamp mechanism of the present invention includes a disk clamper, a main chassis, a disk clamper pushing member and a resilient member. The disk clamper is provided in opposition to a turntable, has a contact surface contacting a disk on a side facing the turntable, and has a convex portion on a side opposite to the contact surface. The main chassis includes a frame body and a disk clamper holding member provided on the frame body for holding the disk clamper. The disk clamper pushing member has a pushing surface that pushes the convex portion of the disk clamper toward the disk and first and second end portions provided on both sides of the pushing surface. The first end portion is swingably supported by the main chassis, and the disk clamper pushing member swingably moves so as to make the pushing surface be displaced in a direction perpendicular to a surface of the disk. The resilient member urges the second end portion of the disk clamper pushing member in a direction in which the pushing surface pushes the disk.

EFFECT OF THE INVENTION

According to the present invention, the first end portion of the disk clamper pushing member is swingably supported by the main chassis, and the second end portion is urged toward the turntable by means of the resilient member. Therefore, the disk clamp operation does not cause the creep deformation of a part of the disk clamber holding member. As a result, it becomes possible to obtain the disk clamp mechanism capable of surely clamping the disk onto the turntable.

DESCRIPTION OF REFERENCE MARKS

1 . . . disk device, 11 . . . main chassis, 11a . . . rectangular frame portion, 11b . . . disk clamper holding member, 13 . . . disk clamper, 13a . . . contact surface, 13b . . . convex portion, 14 . . . disk clamper pushing member, 15 . . . coil spring.

BEST MODE FOR CARRYING OUT THE INVENTION

Embodiment 1

First, the configuration and operation of a DVD player device (hereinafter, a disk device) in which a disk clamp mechanism according to Embodiment 1 of the present invention is mounted will be described.

Figure 1:
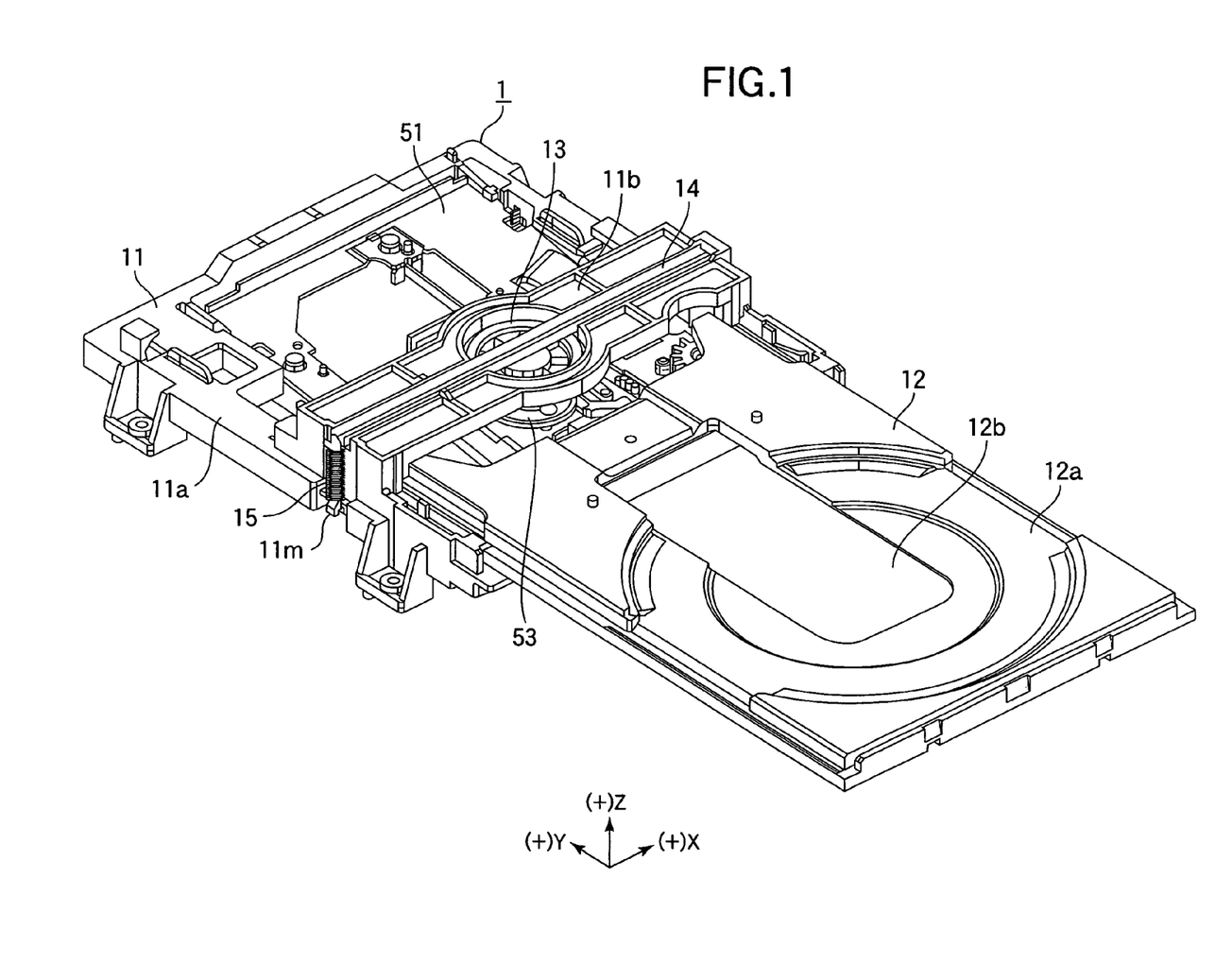
FIG. 1 is a top perspective view showing a state in which a disk tray of a disk device according to Embodiment 1 of the present invention is ejected.
Figure 2:
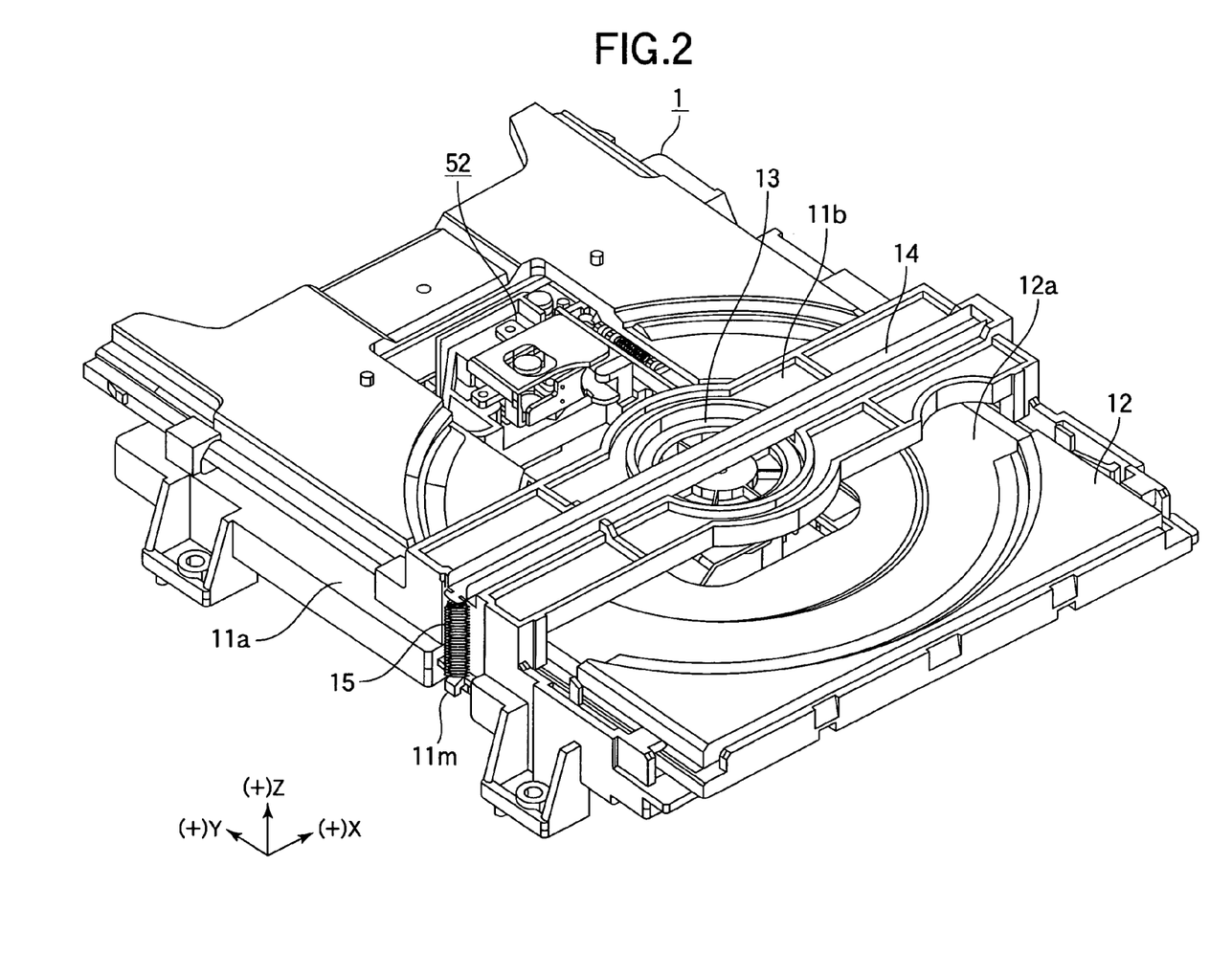
FIG. 2 is a top perspective view showing a state in which the disk tray of the disk device according to Embodiment 1 of the present invention is retracted.

FIGS. 1 and 2 are top perspective views showing the disk device 1 according to Embodiment 1. In this regard, FIG. 1 shows a state in which a disk tray 12 of the disk device 1 is in a protruding position, and FIG. 2 shows a state in which the disk tray 12 of the disk device 1 is retracted.

As shown in FIG. 1, the disk device 1 includes a main chassis 11, a disk tray 12 provided on the main chassis 11 so as to be retracted into and ejected from the main chassis 11, and a traverse chassis 51 swingably provided on the main chassis 11.

Here, for convenience of explanation, directions on the same plane as the disk tray 12 (i.e., the same plane as a surface of a disk on the disk tray 12) and parallel to the directions of retraction/ejection of the disk tray 12 are defined as the Y directions. Directions on the aforementioned plane and perpendicular to the Y directions are defined as the X directions. Directions perpendicular to the same plane as the disk tray 12 (i.e., directions perpendicular to the surface of the disk) are defined as the Z directions. With regard to the Y directions, a direction in which the disk tray 12 is retracted into the main chassis 11 is defined as +Y direction, and a direction in which the disk tray 12 is ejected from the main chassis 11 is defined as −Y direction. With regard to the X directions, the right direction as viewed facing the +Y direction is defined as +X direction, and the left direction is defined as −X direction. With regard to the Z directions, a direction from the disk tray 12 toward a disk clamper 13 is defined as +Z direction, and the opposite direction is defined as −Z direction.

The main chassis 14 includes a rectangular frame portion 11a in which the disk tray 12 can be stored, and a disk clamper holding member 11b which are integrally formed of resin. The disk clamper holding member 11b extends between a pair of opposing side walls of the rectangular frame portion 11a at the +Z side of the rectangular frame portion 11a. The disk tray 12 is able to pass through between the rectangular frame portion 11a and the disk clamper holding member 11b. A disk clamper 13 in the form of a circular disk is stored and held at the center portion of the disk clamper holding member 11b.

The disk tray 12 is a rectangular plate member that can be stored in the rectangular frame portion 11a of the main chassis 11. By the reciprocate movement of the disk tray 12 in the Y direction, the disk tray 12 is retracted into or ejected from the rectangular frame portion 11a of the main chassis 11. A receiving portion 12a for placing the disk is provided on the surface of the +Z side of the disk tray 12. The disk tray 12 has an opening 12b that allows access to the disk on the receiving portion 12a from the −Z side.

As shown in FIGS. 1 and 2, the traverse chassis 51 is a rectangular plate member having a size such that the traverse chassis 51 can be placed inside the rectangular frame portion 11a of the main chassis 11 in the XY plane. The traverse chassis 51 is supported by the main chassis 11 at a periphery of the +Y side of the traverse Chassis 51 so that the traverse chassis 51 is swingable about a swinging axis of the X direction. Further, the traverse chassis 51 swings from a state in which the traverse chassis 51 is parallel to the XY plane (FIG. 2) to a state in which the traverse chassis 51 is inclined with respect to the XY plane toward the −Z direction (FIG. 1). A turntable 53 is mounted on the end portion of the traverse chassis 51 in the −Y direction. Further, an optical pickup unit 52 is supported on the traverse chassis 51 so that the optical pickup unit 52 is movable in the Y direction, and the optical pickup unit 52 records an information signal on the disk or reproduce the information signal recorded on the disk. The turntable 53 moves upward or downward in the Z direction in accordance with the swinging of the traverse chassis 51. When the turntable 53 is in a raised position, the turntable 53 and the disk clamper 13 clamp the disk therebetween and rotate the disk.

Next, the entire operation of the disk device 1 will be described. As shown in FIG. 1, when the disk tray 12 protrudes outside the main chassis 11, the traverse chassis 51 is in position where the turntable 53 has swung in the direction away from the disk clamper 13 (i.e., downward). In this state, the traverse chassis 51 is inclined to the −Z direction with respect to the main chassis 11, so that the optical pickup unit 52 and the turntable 53 mounted on the traverse chassis 51 do not interfere with the disk to be stored in the disk device 1.

After the disk (not shown) is placed on the receiving portion 12a of the disk tray 12, the disk tray 12 moves in the +Y direction, and the disk is stored in the main chassis 11. When the disk placed on the receiving portion 12a reaches the position right above the turntable 53, the traverse chassis 51 swings in the +Z direction about the swinging axis, and becomes parallel to the main chassis 11 as shown in FIG. 2.

As the traverse chassis 51 becomes parallel to the main chassis 11, the turntable 53 is moved upward and lifts the disk placed on the receiving portion 12a of the disk tray 12 to clamp the disk between the turntable and the disk clamper 13. The disk clamper 13 is pushed to the turntable 53 side by a disk clamper pushing member 14 as described later. The disk clamper 13, the turntable 53 and the disk clamper pushing member 14 constitute a disk clamp mechanism.

In this state, the turntable 53 rotates, and the disk rotates at a predetermined rotational speed.

Further, the optical pickup unit 52 moves in the radial direction of the disk (Y direction in the drawing), and information signal is recorded on a predetermined data area of the disk, or information signal recorded in the disk is reproduced.

After the recording or reproducing of the information signal is completed, the traverse chassis 51 swings downward (−Z direction), so that the optical pickup unit 52 and the turntable 53 shift downward, Then, the disk tray 12 having the receiving portion 12a on which the disk is placed moves in the −Y direction, and protrudes outwardly from the disk device 1 as shown in FIG. 1. With this, the disk is ejected outside the disk device 1.

Next, the disk clamp mechanism according Embodiment 1 will be described in detail.

Figure 3:
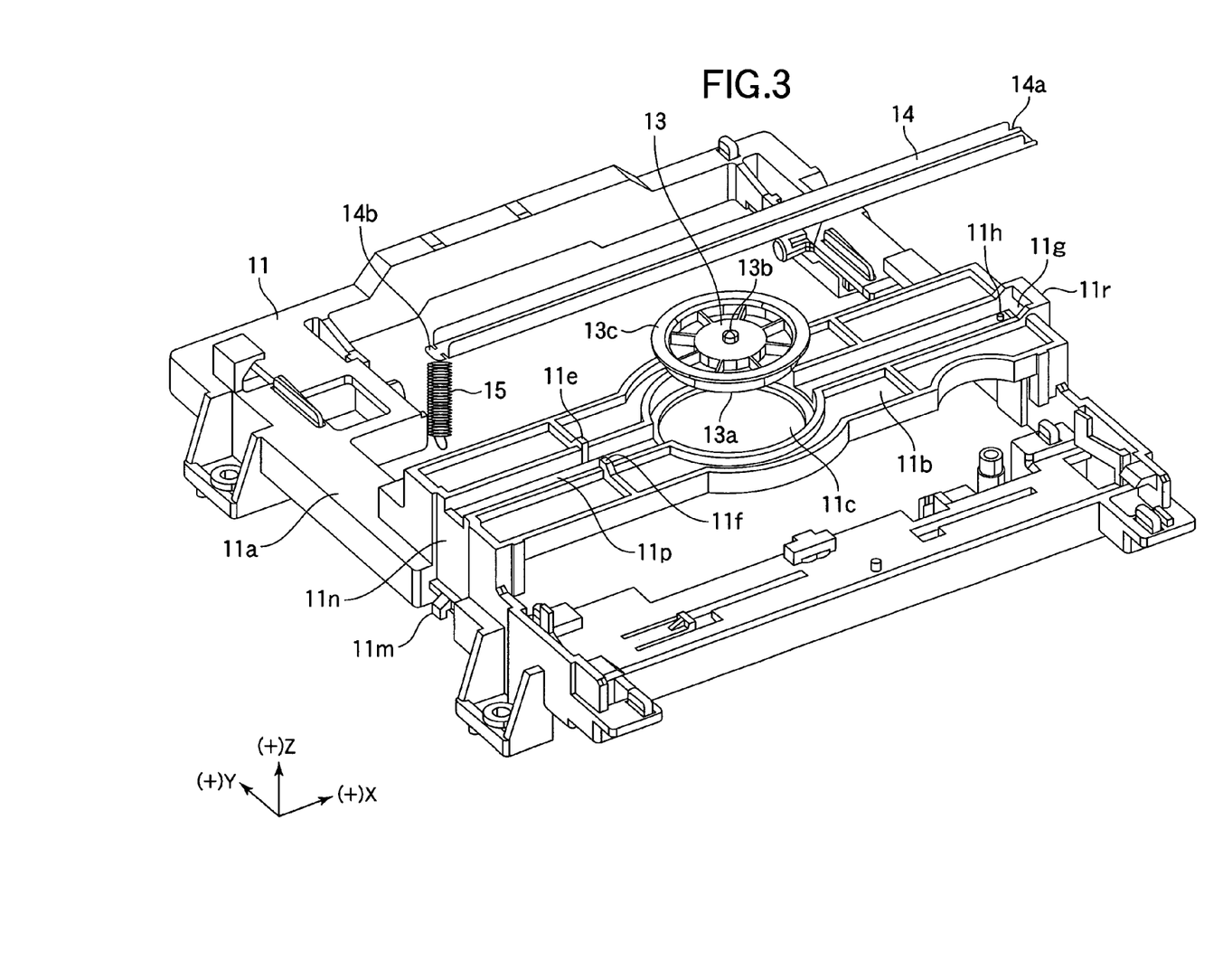
FIG. 3 is a top perspective view showing a state in which a disk clamp mechanism according to Embodiment 1 of the present invention is disassembled.
Figure 4A:
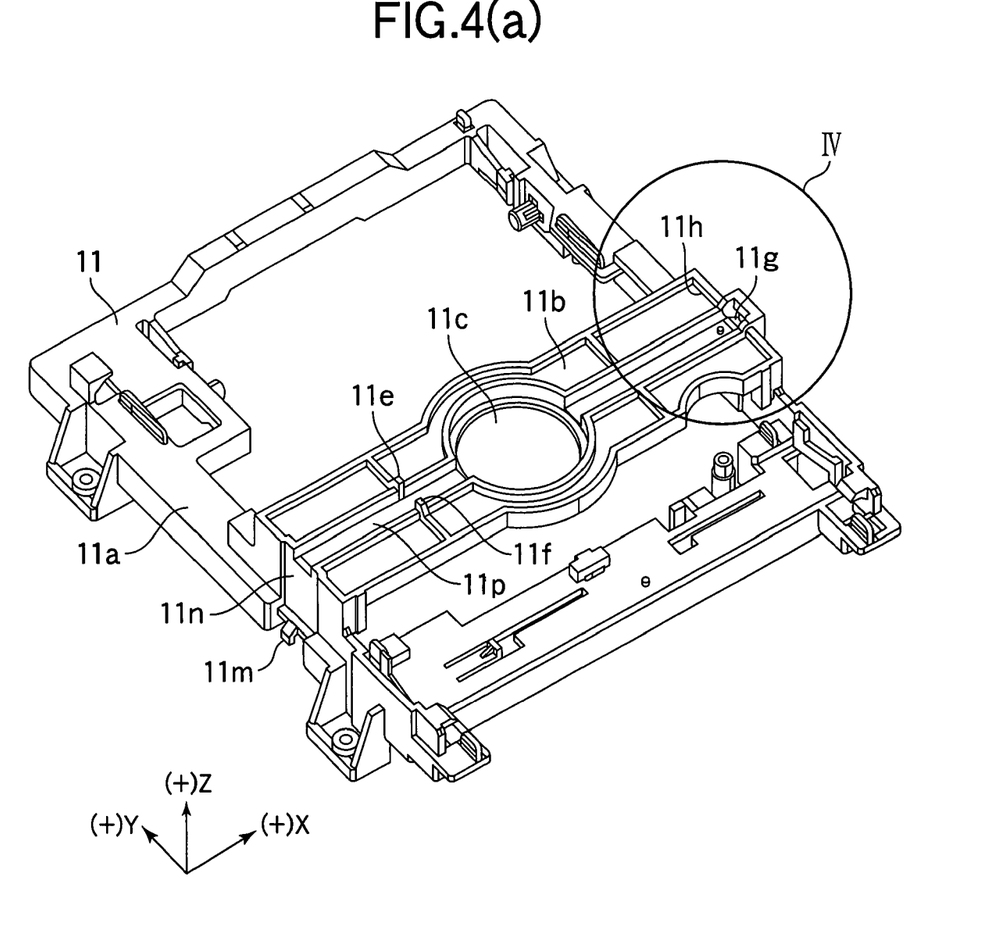
FIG. 4(a) is a top perspective view showing a main chassis of the disk clamp mechanism according to Embodiment 1 of the present invention.
Figure 4B:
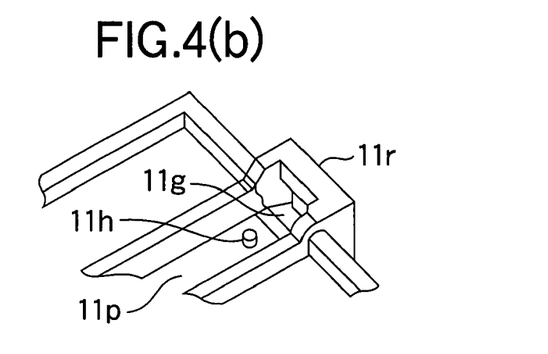
FIG. 4(b) is a perspective view showing a supporting portion of a disk clamper pushing member in an enlarged scale.
Figure 5:
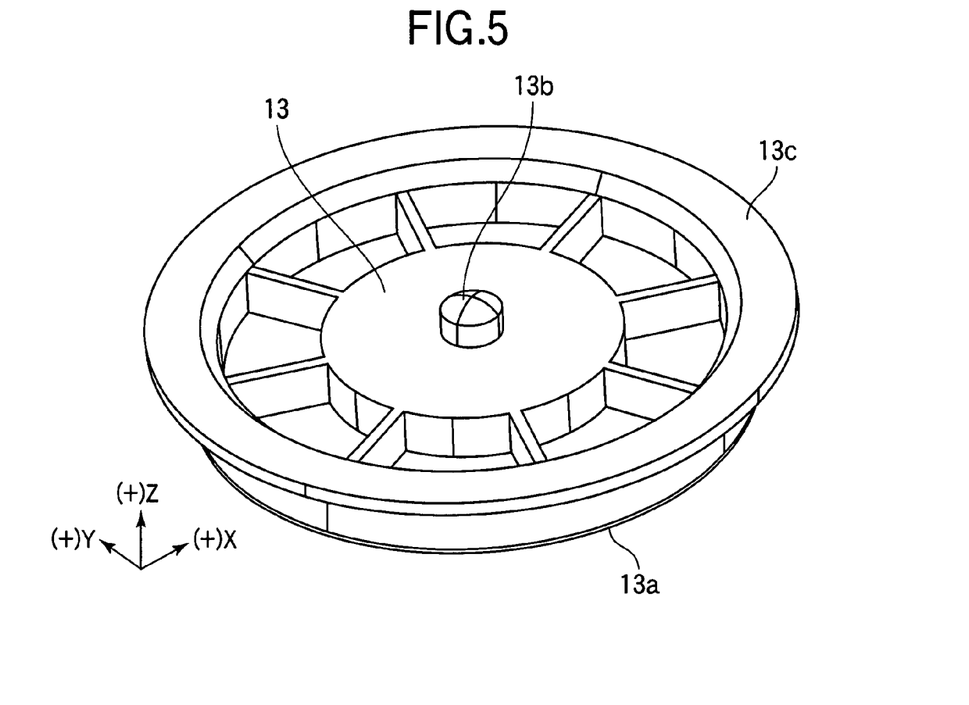
FIG. 5 is a top perspective view showing a disk clamper of the disk clamp mechanism according to Embodiment 1 of the present invention.
Figure 6:
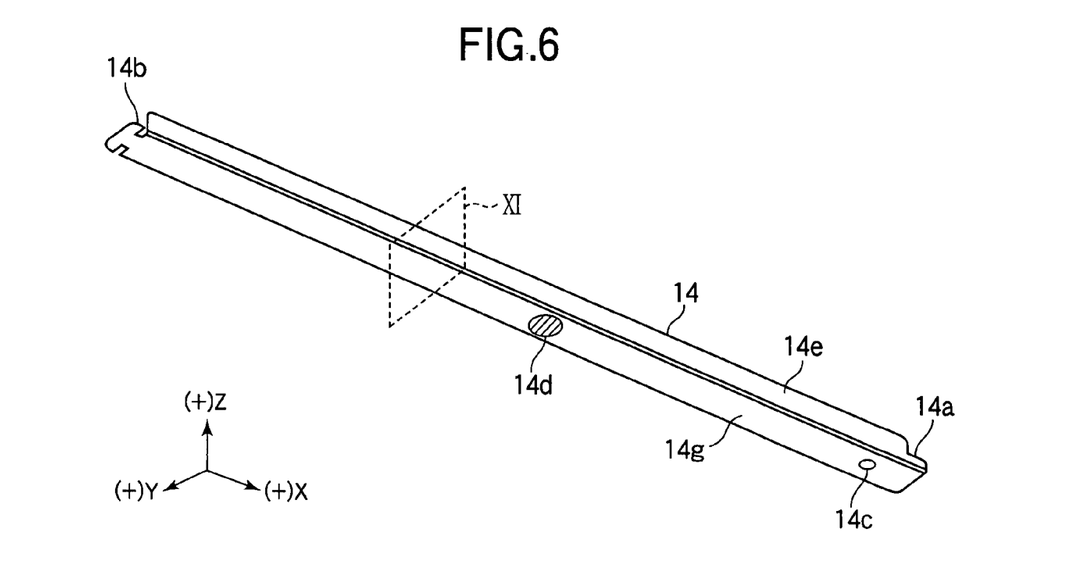
FIG. 6 is a bottom perspective view showing the disk clamper pushing member of the disk clamp mechanism according to Embodiment 1 of the present invention.

FIG. 3 is an exploded top perspective view showing the disk clamp mechanism. FIG. 4(a) is a top perspective view showing the main chassis 11. FIG. 4(b) is a perspective view showing a supporting portion for the disk clamper pushing member 14 in an enlarged scale. FIG. 5 is a top perspective view showing the disk clamper 13. FIG. 6 is a bottom perspective view showing the disk clamper pushing member 14.

As shown in FIG. 3, the disk clamp mechanism includes the disk clamper 13 held inside a disk clamper holding portion 11C of the main chassis 11 and the disk clamper pushing member 14 mounted on the main chassis 11 for pushing the disk clamper 13 in the −Z direction.

The disk clamper pushing member 14 is a longitudinal member elongated in the X direction along the described disk clamper holding member 11b. An end portion (first end portion) 14a of the disk clamper pushing member 14 is swingably supported by the main chassis 11 as described later. The other end portion (second end portion) 14b of the disk clamper pushing member 14 is linked to a coil spring 15 and is urged in the −Z direction.

As shown in FIG. 4(a), the main chassis 11 that constitute a base of the disk clamp mechanism, includes the above described rectangular frame portion 11a and the disk clamper holding member 11b. Both ends of the disk clamper holding member 11b in the X direction are connected to both side walls of the rectangular frame portion 11a in the X direction. A circular opening (i.e., the disk clamper holding portion 11c) for holding the disk clamper 13 is formed on the center portion (in the X direction) of the disk clamper holding member 11b. A groove 11p extends in the X direction throughout the entire length of the disk clamper holding member 11b for storing the disk clamper pushing member 14.

FIG. 4(b) is an enlarged view showing an end of the disk clamper holding member 11b, i.e., a part encircled by a circle IV in FIG. 4(a) in an enlarged scale. The end portion of the disk clamper holding member 11b in the +X direction constitutes a protruding portion 11r that protrudes in the +Z direction. A concave portion 11g that opens to the −X side and has a predetermined depth is formed on the protruding portion 11r. An end portion 14a of the disk clamper pushing member 14 is inserted into the concave portion 11g, and constitutes a swinging fulcrum. Inside the groove 11p, a boss 11h is formed adjacent to the concave portion 11g in the −X direction. The boss 11h is configured to engage a hole 14c (FIG. 6) of the disk clamper pushing member 14 when the end portion 14a of the disk clamper pushing member 14 is inserted into the concave portion 11g.

As shown in FIG. 3, a recess 11n for holding the coil spring 15 is formed in the Z direction at the −X direction end of the disk clamper holding member 11b. Further, a hook portion 11m is formed below the recess 11n at the end portion of the disk clamper holding member 11b in the −X direction, and the hook portion 11m engages an end of the coil spring 15.

The groove 11p in the X direction provided on the disk clamper holding member 11b has a width approximately the same as or wider than the width of the base surface of the disk clamper pushing member 14, and stores the disk clamper pushing member 14 therein. The guide portions 11e and 11f in the form of projections are formed on both side surfaces of the groove 11p, and have the heights higher than the side surfaces of the groove 11p in the Z direction. The guide portions 11e and 11f protrude inwardly from the side surfaces of the groove 11p, and are able to contact the side surfaces of the disk clamper holding member 14. The guide portions 11e and 11f prevent the disk clamper holding member 14 from swinging about the boss 11h in the XY plane. In other words, the disk clamper pushing member 14 is not swingable in the XY plane but is swingable only in the XZ plane.

As shown in FIG. 5, the disk clamper 13 is in the form of a circular disk. A contact, surface 13a is formed on a side of the disk clamper 13 facing the turntable 53. On a side of the disk clamper 13 opposite to the turntable 53, a hemispheric convex portion 13b is formed on the center in the radial direction, of the disk clamper 13, and a flange portion 13c is formed to protrude outwardly from the periphery of the above described contact surface 13a.

The disk clamper 13 is retracted inside the disk clamper holding portion 11c (FIG. 3) formed on the disk clamper holding member 11b. The flange portion 13c of the disk clamper 13 is supported by a bottom portion 11j (FIG. 7) of the disk clamper holding portion 11c from below. On the retraction/ejection of the disk tray 12, the bottom portion 11j of the disk clamper holding portion 11c abuts against the flange portion 13c to lift the disk clamper 13 upward in the +Z direction, and supports the disk clamper 13 on the upper side (+Z side) with respect to the moving path of the disk tray 12 and the disk. With this, the interference of the disk clamper 13 with the disk tray 12 and the disk that reciprocally move in the Y direction can be prevented.

The disk clamper pushing member 14 shown in FIG. 6 is formed of a metal plate having a thickness of 0.4 mm and has a length (the dimension in the X direction) approximately the same as the disk clamper holding member 11b. The disk clamper pushing member 14 has an elongated bottom plate 14g having a width of approximately 3 mm, and a pair of side plates 14e and 14f formed along both width-wise edges of the bottom plate 14g (one side plate 14f is omitted in FIG. 6). The heights (the dimension in the Z direction) of the side plates 14e and 14f are approximately 3 mm. The end portion 14a of the disk clamper pushing member 14 in the +X direction is inserted into the concave portion 11g (FIG. 4) of the above described main chassis 11. The hole 14c is formed in the vicinity of the end portion 14a of the disk clamper pushing member 14. In a state where the end portion 14a of the disk clamper pushing member 14 is inserted in the concave portion 11g (FIG. 4) of the main chassis 11, the hole 14c fits the boss 11h of the main chassis 11, and the side plates 14e and 14f are placed in between the guide portions 11e and 11f of the main chassis 11. With this, the disk clamper pushing member 14 becomes swingable only in the XZ plane. As shown in FIG. 3, the end portion 14b of the disk clamper pushing member 14 in the −X direction is fixed to an end of the coil spring 15 opposite to the end fixed to the hook portion 11m of the main chassis 11, and is urged in the −Z direction. A pushing surface 14d is formed at the center of the disk clamper pushing member 14, and the pushing surface 14d abuts and pushes downward the convex portion 13b (FIG. 5) of the disk clamper 13.

Next, the detailed operation of the disk clamp mechanism as configured above will be described.

Figure 7:
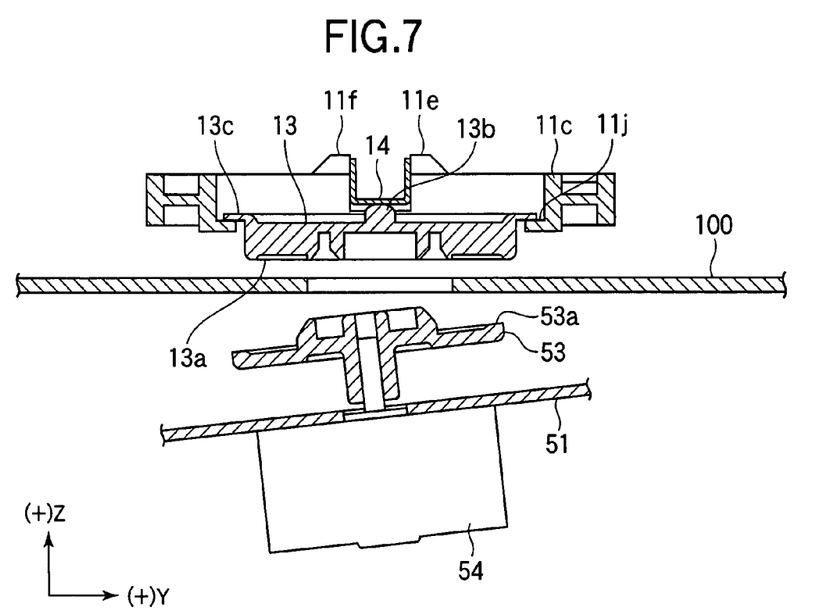
FIG. 7 is a sectional view showing a state of the main part of the disk clamp mechanism according to Embodiment 1 of the present invention immediately before the disk clamp mechanism starts a disk clamp operation.

FIG. 7 shows a state after the disk tray 12 is retracted into the main chassis 11 and immediately before the turntable 53 starts moving upward. In this state, the traverse chassis 51 is inclined, and the turntable 53 is held at a position lower than the feeding path of the disk 100 placed on the disk tray 12 (omitted in FIG. 7).

The flange portion 13c is lifted upward by the bottom portion 11j of the disk clamper holding portion 11c, so that the disk clamper 13 is held at a position higher than the feeding path of the disk 100. In this state, the convex portion 13b of the disk clamper 13 contacts the pushing surface 14d (FIG. 6) of the disk clamper pushing member 14, and the end portion 14b (FIG. 3) of the disk clamper pushing member 14 is urged by the coil spring 15 in the −Z direction, with the result that the disk clamper 13 is pushed in the −Z direction.

When the traverse chassis 51 swings upward and the turntable 53 moves upward, a placing surface 53a of the turntable 53 contacts the disk 100 to lift the disk 100 from the disk tray 12, so that the disk 100 is held on the placing surface 53a Of the turntable 53. When the turntable 53 moves further upward, the disk 100 abuts against the contact surface 13a of the disk clamper 13, so that the disk clamper 13 moves upward together with the disk 100. In other words, the flange portion 13c of the disk clamper 13 moves upward away from the bottom portion 11j of the disk clamper holding portion 11c. Further, the disk clamper 13 is pushed to the turntable side (in the −Z direction) by the disk clamper pushing member 14, and therefore the disk 100 is clamped between the disk clamper 13 and the turntable 53 and is held therebetween.

Figure 8:
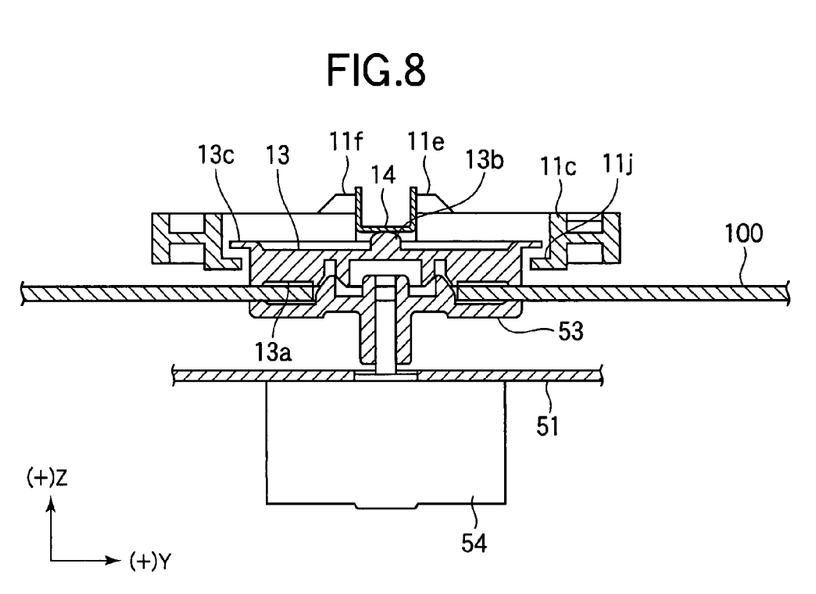
FIG. 8 is a sectional view showing a state of the main part of the disk clamp mechanism according to Embodiment 1 of the present invention having completed the disk clamp operation.

FIG. 8 shows a state where the upward movement of the turntable 53 is completed. In this state, the traverse chassis 51 and the turntable 53 are in horizontal state (i.e., the rotational axis of the turntable 53 is oriented in the vertical direction). Further, a predetermined gap S is formed between the disk clamper 13 and the bottom portion 11j of the disk clamper holding portion 11c. Then, the disk 100 is rotated together with the turntable 53 by the spindle motor 54, and the recording or reproducing of the information signal is performed on the disk.

Figure 9:
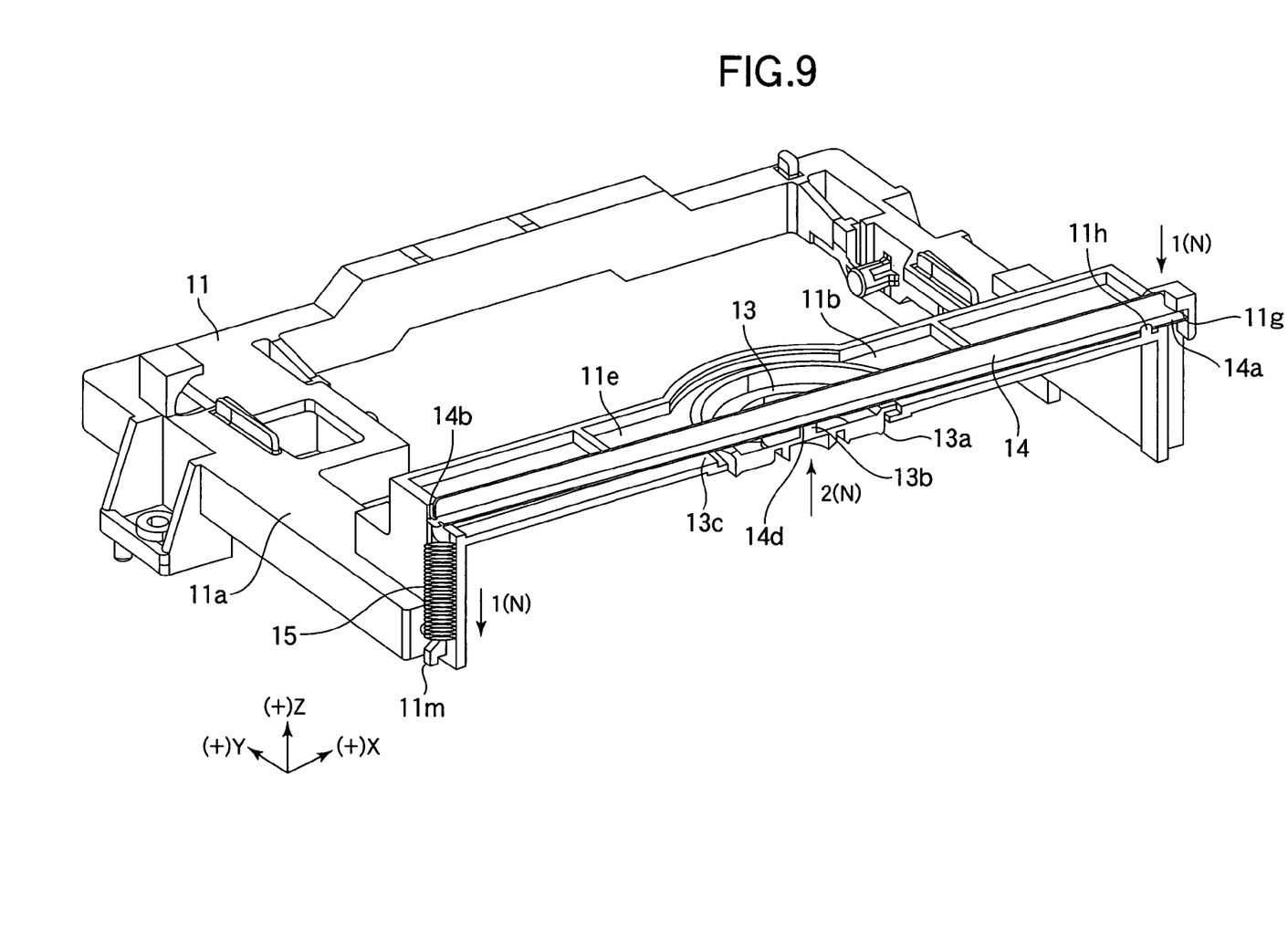
FIG. 9 is a sectional perspective view showing a state of the main part of the disk clamp mechanism according to Embodiment 1 of the present invention having completed the disk clamp operation.

Next, the disk clamp action of the disk clamp mechanism will be described in further detail. FIG. 9 is a perspective view showing the disk clamp mechanism when the disk clamp operation is completed, cut along the XZ plane.

When the disk clamper 13 moves upward together with the turntable 53, the disk clamper pushing member 14 contacting the disk clamper 13 is lifted by the disk clamper pushing member 14 in the +Z direction. As a result, the disk clamper pushing member 14 swings about the end portion 14a in the X direction so that the other end portion 14b shifts in the +Z direction. Therefore, the coil spring 15 fixed to the other end portion 14b of the disk clamper pushing member 14 is stretched.

The dimension and the spring coefficient of the coil spring 15 is so determined as to generate a force of 1N in the −Z direction in a state where the disk 100 is clamped between the disk clamper 13 and the turntable (i.e., during the disk clamp operation). Therefore, the force of 1N is applied to either of the'end portions 14a and 14b of the disk clamper pushing member 14. In contrast, by the upward movement of the turntable 53 (FIG. 8), a force in the +Z direction is applied to the pushing surface 14d of the disk clamper pushing member as shown by an arrow in the drawing, and the magnitude of the force is double the resilient force of the coil spring 15, i.e., 2N. The forces applied to both end portions 14a and 14b of the disk clamper pushing member 14 and the force applied to the pushing surface 14d are balanced. Thus, the disk 100 is clamped between the disk clamper 13 (pushed by the disk clamper pushing member 14) and the turntable 53 with the force of 2N and held therebetween.

Although the disk clamper pushing member 14 is applied with the force during the disk clamp operation as described above, the disk clamper pushing member 14 is fixed to the connecting portions of the rectangular frame portion 11a and the disk clamper holding member 11b, and therefore a force causing a deformation (curving) of the disk clamper holding member 11b is not generated. Accordingly, even when the disk device is left under the high temperature environment, the creep deformation of the disk clamper holding, member 11b does not occur.

In contrast, the main chassis 11 is applied with a force in the direction opposite to the force applied to both end portions 14a and 14b of the disk clamper pushing member 14. In other words, the concave portion 11g of the main chassis 11 is applied with the force of 1N in the −Z direction, and the hook portion 11m of the main chassis 11 is applied with the force of 1N in the +Z direction. This force is such that the side walls of the rectangular frame portion 11a at the ends in the +X direction and −X direction are curved in the YZ plane. However, the thickness of the side walls of the rectangular frame portion 11a has no influence on the reduction of thickness of the disk device, and therefore the side walls can be sufficiently thick so as to prevent the creep deformation. Accordingly, the creep deformation of the main chassis 11 does not occur.

Further, the end portions 14a and 14b and the pushing surface 14d of the disk clamper pushing member are applied with the forces in the directions in which the disk clamper pushing member 14 is curved in the Z direction. However, the disk clamper pushing member 14 has a rectangular U-shape with the height (dimension in the Z direction) of 3 mm that provides a rib effect, and therefore the disk clamper pushing member 14 has a sufficient rigidity against the deformation (curving) due to the coil spring 15. Accordingly, the deformation of the disk clamper pushing member 14 does not occur.

As described above, according to Embodiment 1, the end portion 14a of the disk clamper pushing member 14 is swingably supported at the side wall of the +X side of the main chassis 11, and the other end 14b of the disk clamper pushing member 14 is urged in the −Z direction at the side wall of the −X side of the main chassis 11. Therefore, it becomes possible to prevent generation of the force that causes curvature in the disk clamper holding member 11b. Accordingly, even when the disk device is left under the high temperature environment, no deformation occurs on the disk clamper holding member 11b, the main chassis 11 or the disk clamper pushing member 14. That is, it becomes possible to obtain the disk clamp mechanism having high reliability and capable of surely clamping the disk onto the turntable 53.

Further, since the force causing the deformation (curving) of the disk clamper holding member 11b does not occur, it is not necessary to thicken the disk clamper holding member 11b to enhance the rigidity of the disk clamper holding member 11b to thereby restrict the bending stress. Further, with regard to the force applied to the rectangular frame portion 11a, the creep deformation can be prevented by increasing the thickness in the direction other than the Z direction. As described above, the strength of the main chassis 11 can be ensured without increasing the height in the +Z direction, and therefore the disk clamp mechanism having the same size as or a smaller size than the conventional disk clamp mechanism can be obtained. As a result, the disk device having the same size as or a smaller size than the conventional disk device can be obtained.

Further, a spring stainless steel band which is a general material of a plate spring disclosed in the Patent Document No. 1 is expensive, and is hard to obtain since a special die is required to manufacture the spring stainless steel band. In contrast, in Embodiment 1 uses the disk clamper pushing member 14 and the coil spring 15 are used instead of the plate spring for pushing the disk clamper 13 against the turntable 53, and therefore it becomes possible to obtain an inexpensive disk clamp mechanism. For example, in general, the coil spring 15 can be obtained at a cost of approximately one fifth of the plate spring. Further, when the disk clamper pushing member 14 is formed of a metal thin plate having the thickness of 0.4 mm, the disk clamper pushing member 14 can be obtained at a cost of approximately 2.5 times the coil spring. In other words, by replacing the plate spring with the disk clamper pushing member 14 and, the coil spring 15, it becomes possible to reduce the cost corresponding to one and half of the coil spring 15. Further, unlike the plate spring, the coil spring 15 does not need the special die, and therefore the coil spring 15 can easily be obtained.

Further, the disk clamper pushing member 14 is urged by the coil spring 15 provided between the end portion 14b and the hook portion 11m of the chassis 11, and therefore the configuration for urging the disk clamper 14 in the −Z direction can be simple.

Embodiment 2

Figure 10:
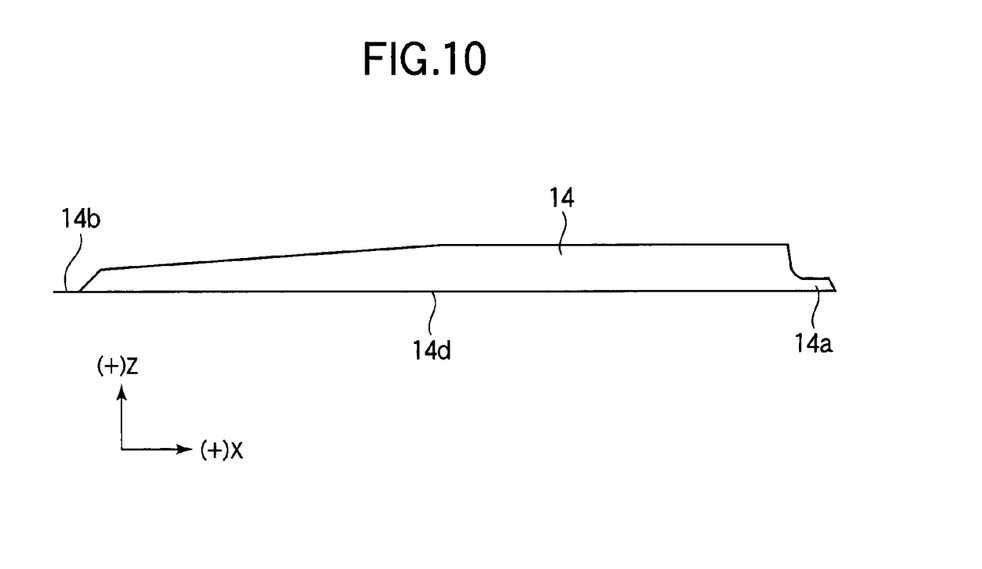
FIG. 10 is a front view showing a disk clamper pushing member of a disk clamp mechanism according to Embodiment 2 of the present invention.

FIG. 10 is a front view showing a side portion of the disk clamper pushing member 14 of the disk device 1 according to Embodiment 2, as seen from the +Y side. In the above described Embodiment 1, the height (dimension in the Z direction) of the disk clamper pushing member 14 is constant (see FIGS. 2 and 3). In this Embodiment 2, the height of the disk clamper pushing member 14 decreases, from the center portion to the end portion 14b.

To be more specific, the height (dimension in the Z direction) of the disk clamper pushing member 14 gradually decreases, from the center portion of the disk clamper pushing member 14 to the end portion 14b in the −X direction. In contrast, the height of the disk clamper pushing member 14 is constant, from the center portion of the disk clamper pushing member 14 to the end portion 14a in the +X direction (the portion attached to the main chassis 11 as the swinging fulcrum).

During the disk clamp operation, the disk clamper pushing member 14 swings in the +Z direction about the end portion 14a in the +X direction, and therefore the closer a position on the disk clamper pushing member 14 approaches the end portion 14b in the −X direction, the more the shifting amount at the position increases in the +Z direction. In this embodiment, the height of the disk clamper pushing member 14 decreases toward the end portion 14b in the −X direction, and therefore protruding amount of the disk clamper pushing member 14 in the +Z direction can be reduced. As a result, the dimension of the disk clamp mechanism in the +Z direction can be reduced, so that a thinner disk device can be obtained.

Generally, when an external force acts on a substance, the force applied to the substance is the largest at the point of action and decreases as receding from the point of action. Therefore, the force applied to the disk clamper pushing member 14 by the disk clamper 13 is the largest at the pushing surface 14d (for example, 2N) and decreases toward the end portion 14a or 14b (for example, 1N). Accordingly, even when the disk clamper pushing member 14 is so configured that the height thereof decreases from the center portion to the end portion 14b, the disk clamper pushing member 14 can sufficiently tolerate the force of deforming (curving) the disk clamper pushing member 14.

As described above, according to Embodiment 2, the height (the dimension in Z direction) of the disk clamper pushing member 14 gradually decreases from the center portion to the end portion 14b in the −X direction, and therefore the protruding amount of the disk clamper pushing member 14 in the +Z direction can be reduced. As a result, the disk clamp mechanism can be thinned while maintaining the force of clamping the disk, so that a thinner disk device can be obtained.

Embodiment 3

Figure 11A:
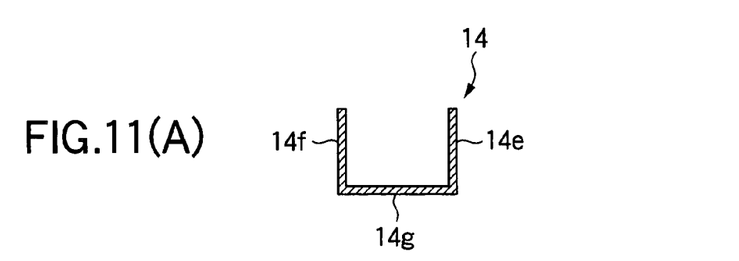
FIGS. 11(A), 11(B) and 11(C) are perspective views showing a configuration example of a disk clamper pushing member of a disk clamp mechanism according to Embodiment 3 of the present invention.
Figure 11B:
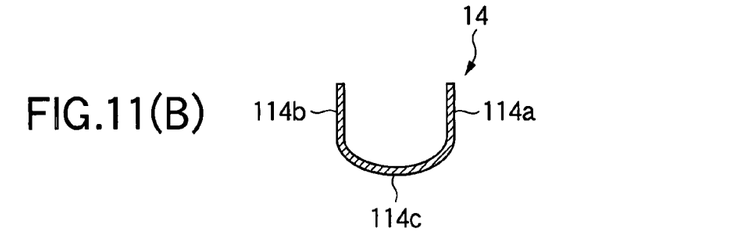
Figure 11C:
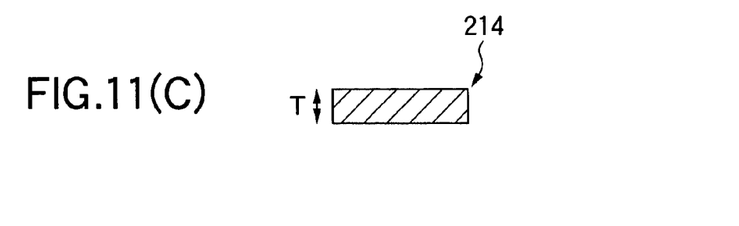

FIGS. 11(A) through 11(C) are sectional views Showing the sectional shapes of the disk clamper pushing member according to this embodiment, compared with the sectional shape (FIG. 11A)) of the disk clamper pushing member 14 according to the above described Embodiment 1. FIGS. 11(A) through 11(C) correspond to a section cut along a surface XI (YZ plane) shown in FIG. 6.

Although the disk clamper pushing member 14 of the above described Embodiment 1 has a rectangular U-shaped section for ensuring the strength as shown in FIG. 11(A), the strength can be ensured even when the disk clamper pushing member has other sectional shape. For example, the disk clamper pushing member 114 shown in FIG. (B) has a U-shaped section instead of the rectangular U-shaped section. In this case, the disk clamper pushing member 114 includes, in the YZ plane, a pair of opposing side plate portions 114a and 114b and a bottom plate portion 114c curved in the −Z direction. Further, it is also possible to employ a W-shaped section instead of the U-shaped section. With such sections, the strength tolerating the force applied by the disk clamper 13 (such that the disk clamper pushing member 114 is curved) can be obtained by means of the rib effect, as is the case with the rectangular U-shaped section.

Further, in the case where the disk clamper pushing member 114 is formed of a flat plate member (or a flat plate member around which a thin sheet metal is wound) as shown in FIG. 11C, it is only necessary that the disk clamper pushing member 114 has a thickness T (the dimension in the Z direction) sufficient for tolerate the force applied by the disk clamper 13.

Embodiment 4

Figure 12:
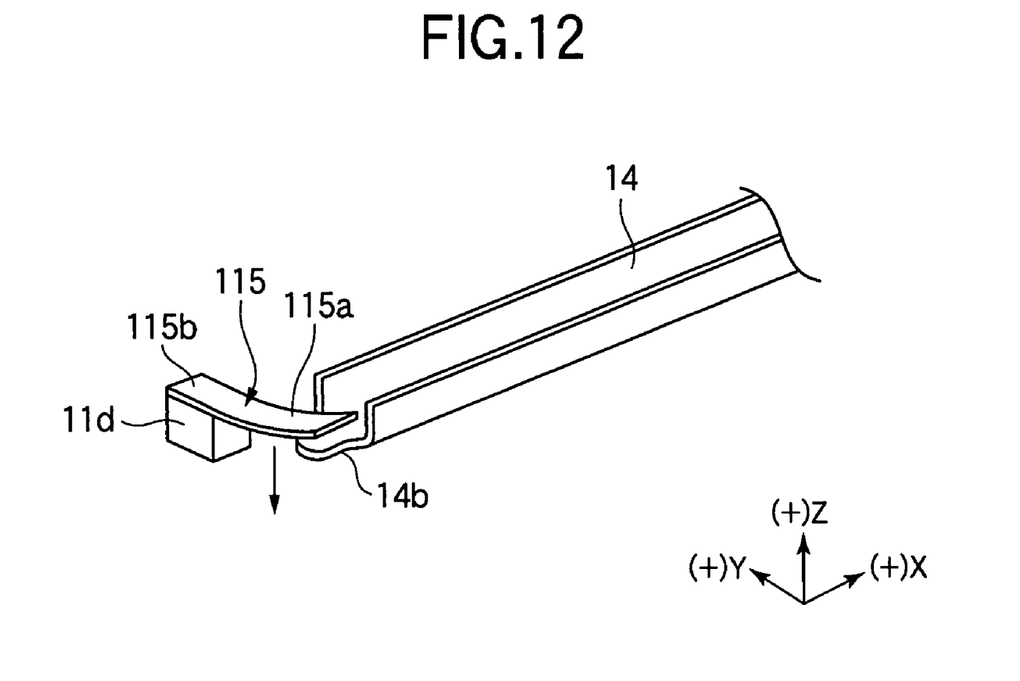
FIG. 12 is a schematic view showing configuration for urging in a disk clamp mechanism according to Embodiment 4 of the present invention.

FIG. 12 is a perspective view showing an example of a configuration for urging the disk clamper pushing member 14 in Embodiment 4. Although, in the above described Embodiment 1, the end portion 14b of the disk clamper pushing member 14 is urged in the −Z direction using the coil spring 15 (FIG. 3), it is also possible to use a plate spring or a flat spiral spring instead of the coil spring 15. In the example shown in FIG. 12, a plate spring 115 is used. In this case, an end 115a of the plate spring 115 in the longitudinal direction is fixed to a fixing member 11d provided on the main chassis 11, and the other end 115b urges the end portion 14b of the disk clamper pushing member 14 in the −Z direction. In this regard, the urging of the disk clamper pushing member 14 using the plate spring or flat spiral spring can be performed by other methods; as long as a sufficient force for clamping the disk is obtained.

The invention claimed is:

1. A disk clamp mechanism comprising:
a disk damper provided in opposition to a turntable, said disk damper having a contact surface contacting a disk on a side facing said turntable, said disk damper having a convex portion on a side opposite to said contact surface;
a main chassis including a frame body and a disk damper holding member provided on said frame body for holding said disk damper, said frame body having a pair of opposing side walls;
a disk damper pushing member having a pushing surface that pushes said convex portion of said disk damper toward said disk, and first and second end portions provided on both sides of said pushing surface, said first end portion being swingably supported by said main chassis, said disk damper pushing member swingably moving so as to make said pushing surface be displaced in a direction perpendicular to a surface of said disk, and
a resilient member that urges said second end portion of said disk damper pushing member in a direction in which said pushing surface pushes said disk,
wherein said disk damper holding member has an elongated shape, and extends between said opposing side walls of said main chassis.

2. The disk clamp mechanism according to claim 1, wherein said frame body of said main chassis includes a pair of opposing side walls, and
wherein said first end portion of said disk damper pushing member is swingably supported at one of said side walls of said frame body, and said second end portion of said disk damper pushing member is urged by said resilient member at the other of said side walls of said frame body.

3. The disk clamp mechanism according to claim 2, wherein said disk damper holding member is an elongated member whose both ends are connected to said pair of opposing side walls of said frame body of said main chassis.

4. The disk clamp mechanism according to claim 3, wherein said disk damper holding member has a groove portion in which said disk damper pushing member is placed.

5. The disk clamp mechanism according to claim 1, wherein said resilient member is a coil spring provided between said second end portion of said disk damper pushing member and said main chassis.

6. A disk device comprising:
said disk clamp mechanism according to claim 1;
a turntable that holds said disk between said turntable and said disk clamp mechanism, and
a pickup unit that performs at least one of recording onto and reproducing from said disk rotated by said turntable an information signal.

7. A disk clamp mechanism comprising:
a disk damper provided in opposition to a turntable, said disk damper having a contact surface contacting a disk on a side facing said turntable, said disk damper having a convex portion on a side opposite to said contact surface;
a main chassis including a frame body and a disk damper holding member provided on said frame body for holding said disk clamper,
a disk damper pushing member having a pushing surface that pushes said convex portion of said disk damper toward said disk, and first and second end portions provided on both sides of said pushing surface, said first end portion being swingably supported by said main chassis, said disk damper pushing member swingably moving so as to make said pushing surface be displaced in a direction perpendicular to a surface of said disk, and
a resilient member that urges said second end portion of said disk damper pushing member in a direction in which said pushing surface pushes said disk, wherein said disk damper pushing member further includes a pair of side plate portions both extending from said first end portion to said second end portion, and facing each other.

8. The disk clamp mechanism according to claim 7, wherein dimensions of said side plate portion in a direction perpendicular to said surface of said disk are smaller at said second end portion than at said first end portion.

* * * * *